(12) United States Patent
Tran et al.

(10) Patent No.: US 10,452,056 B2
(45) Date of Patent: Oct. 22, 2019

(54) THREE-DIMENSIONAL OBJECT FABRICATION USING MULTIPLE EXTRUDERS

(71) Applicant: Microsoft Technology Licensing, LLC, Redmond, WA (US)

(72) Inventors: Khai Nguyen Tran, Kirkland, WA (US); Emmett Walter Lalish, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 82 days.

(21) Appl. No.: 15/658,762

(22) Filed: Jul. 25, 2017

(65) Prior Publication Data

US 2019/0033827 A1    Jan. 31, 2019

(51) Int. Cl.
| | | |
|---|---|---|
| G06F 19/00 | (2018.01) | |
| G05B 19/4099 | (2006.01) | |
| B29C 64/393 | (2017.01) | |
| B33Y 50/02 | (2015.01) | |
| B29C 64/106 | (2017.01) | |
| B29C 64/118 | (2017.01) | |

(52) U.S. Cl.
CPC ........ *G05B 19/4099* (2013.01); *B29C 64/106* (2017.08); *B29C 64/393* (2017.08); *B33Y 50/02* (2014.12); *B29C 64/118* (2017.08); *G05B 2219/35134* (2013.01); *G05B 2219/49007* (2013.01)

(58) Field of Classification Search
CPC .... F16K 1/12; F16K 31/52408; F16K 31/602; F23C 1/00; F23N 1/00; F23N 1/007; B33Y 50/02; F16M 11/12; F16M 11/18; H04N 13/239; H04N 13/254
See application file for complete search history.

(56) References Cited

U.S. PATENT DOCUMENTS

| | | | | | |
|---|---|---|---|---|---|
| 5,587,913 | A | * | 12/1996 | Abrams | ............ G05B 19/4099 345/420 |
| 5,990,897 | A | * | 11/1999 | Hanratty | ............ G06K 9/00476 345/420 |

(Continued)

FOREIGN PATENT DOCUMENTS

| | | |
|---|---|---|
| WO | 2002021226 A2 | 3/2002 |
| WO | 2016081499 A1 | 5/2016 |
| WO | 2016173063 A1 | 11/2016 |

OTHER PUBLICATIONS

Titsch, Mike, "Mattercontrol 1.2 Includes Multi-Extrusion and Multi-Material Support", http://www.3dprinterworld.com/article/mattercontrol-12-includes-multi-extrusion-and-multi-material-support, Published on: Nov. 19, 2014, 2 pages.

(Continued)

*Primary Examiner* — Kidest Bahta

(57) ABSTRACT

Described herein is a system and method system for fabricating a three-dimensional object using a plurality of extruders. Information including two-dimensional segments of a layer of a three-dimensional object to be fabricated using the plurality of extruders is received. Closed contour, two-dimensional polygons are computed based on the two-dimensional segments. Tool path(s) are generated based on the computed closed contour two-dimensional polygons. The generated tool path(s) are provided to a fabrication apparatus.

20 Claims, 7 Drawing Sheets

(56) References Cited

U.S. PATENT DOCUMENTS

| | | | |
|---|---|---|---|
| 7,682,476 B2* | 3/2010 | Sutton | B44C 3/025 156/250 |
| 2007/0179657 A1* | 8/2007 | Holzwarth | B33Y 50/02 700/119 |
| 2014/0363532 A1* | 12/2014 | Wolfgram | B33Y 30/00 425/113 |
| 2016/0067928 A1* | 3/2016 | Mark | B29C 64/209 264/401 |
| 2016/0075089 A1 | 3/2016 | Duro royo et al. | |
| 2016/0221259 A1* | 8/2016 | Kobida | B29C 64/106 |
| 2016/0342150 A1* | 11/2016 | Jin | G05B 15/02 |
| 2017/0050388 A1 | 2/2017 | Minardi et al. | |

OTHER PUBLICATIONS

"Printing with Multiple Extruders", https://www.simplify3d.com/support/articles/printing-with-multiple-extruders/, Retrieved on: Apr. 12, 2017, 5 pages.

* cited by examiner

THREE-DIMENSIONAL OBJECT FABRICATION USING MULTIPLE EXTRUDERS

BACKGROUND

Three-dimensional objects can be fabricated by various ways including printing and additive process(es). Further, materials consumed can vary by printer or additive process. In order to generate three-dimensional objects, a representation of the three-dimensional object to be fabricated (e.g., 3MF file) is segmented along the z-axis by a renderer (e.g., a slicer) into two-dimensional slices. These slices are then successively utilized to send instructions to a fabrication apparatus such as a three-dimensional printer in order to fabricate the three-dimensional object.

SUMMARY

Described herein is a computing device, comprising a processor and a memory having computer-executable instructions stored thereupon which, when executed by the processor, cause the computing device to receive information including two-dimensional segments of a layer of a three-dimensional object to be fabricated using the plurality of extruders; compute closed contour two-dimensional polygons based on the two-dimensional segments, wherein each computed closed contour two-dimensional polygon comprises at least one of the two-dimensional segments; generate a tool path based on the computed closed contour two-dimensional polygons, the tool path comprising instructions to control movement of a component of a fabrication apparatus; and provide the generated tool path to the fabrication apparatus.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
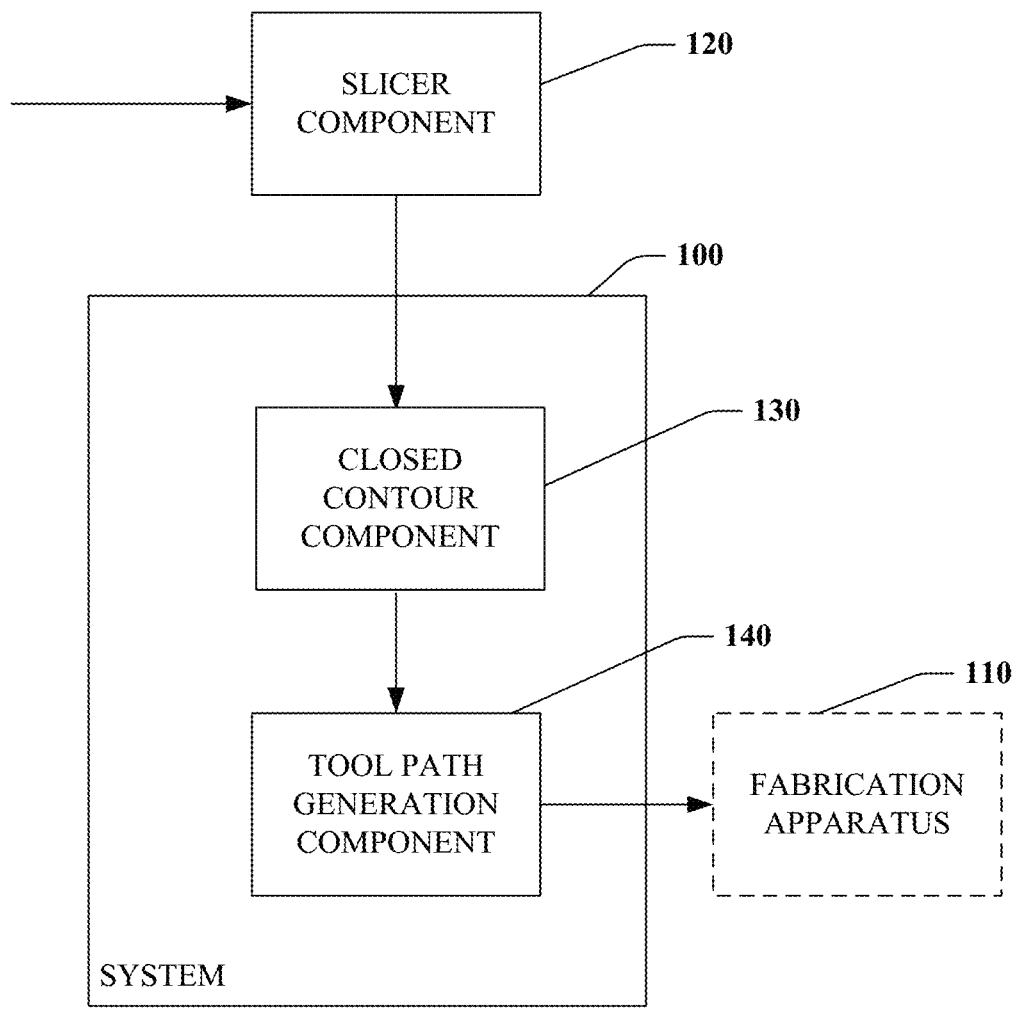
FIG. 1 is a functional block diagram that illustrates a system for fabricating a three-dimensional object using multiple extruders.

Various technologies pertaining to generating a toolpath using closed contours for a fabrication device comprising a plurality of extruders are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding generating a toolpath using closed contours for a fabrication device comprising a plurality of extruders in three-dimensional object fabrication. What follows are one or more exemplary systems and methods.

Aspects of the subject disclosure pertain to the technical problem of fabricating three-dimensional object(s) using a plurality of extruders. The technical features associated with addressing this problem involve, for each layer, computing closed contours (e.g., two-dimensional polygons) for each segment (e.g., two-dimensional segment having a particular color and/or material, for example, each associated with a particular extruder), and, generating a tool path based on the generated closed contours. Accordingly, aspects of these technical features exhibit technical effects of more efficiently and effectively fabricating three-dimensional objects, for example, reducing wasted material and/or wasted fabrication time.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

A multiple extruder three-dimensional fabrication apparatus provides the ability to print three-dimensional object(s) with multiple materials and/or colors. Conventionally, generating a toolpath for a fabrication apparatus with multiple extruders to optimize printing time and produce better quality three-dimensional object(s) has been challenging.

Referring to FIG. 1, a system for fabricating a three-dimensional object using multiple extruders 100 is illustrated. The system 100 can, for example, for each layer, compute closed contours (e.g., two-dimensional polygons) for each two-dimensional segment having a particular color and/or material, for example, associated with a particular extruder of a fabrication apparatus 110. The system 100 can further generate a tool path based on the generated closed contours.

The system 100 can receive information about a portion of the three-dimensional object to be fabricated from a slicer component 120. The slicer component 120 can receive information (e.g., a file) about the three-dimensional object to be fabricated (e.g., printed). In one embodiment, the information comprises a 3D Manufacturing Format file (e.g., 3MF file). The 3MF format describes a set of conventions for the use of XML and other widely available technologies to describe content and appearance of three-dimensional model(s). For example, a 3MF file can include a list of vertices, triangles and meshes for fabricating the three-dimensional object. While the use of 3MF file(s) is discussed herein the subject disclosure is not limited to 3MF files and the subject disclosure can be utilized with any suitable representation of three-dimensional object(s) including, for example, object (OBJ) files, stereo lithography (STL) files, virtual reality modeling language (VRML) files, X3G files, polygon (PLY) files and/or filmbox (FBX) files.

Based on the received information (e.g., file), the slicer component 120 partitions the three-dimensional object to be fabricated into two-dimensional layers. Each of these layers comprises elements such as two-dimensional segments forming a shell of the three-dimensional object at the particular layer.

The slicer component 120 can provide information regarding a layer (e.g., two-dimensional segments) to a closed contour computation component 130 that computes closed contours (e.g., two-dimensional polygons) for each two-dimensional segment (e.g., having a particular color and/or material, for example, associated with a particular extruder). Based on the computed closed contours, a tool path generation component 140 can generate tool path(s) for the plurality of extruders of the fabrication apparatus 110. In one embodiment, the tool path can be generated based upon a material and/or color associated with a particular extruder of a plurality of extruders.

In one embodiment, the closed contour computation component 130 employs a straight skeleton technique to compute straight skeleton vertices to compute two-dimensional polygons for each two-dimensional segment provided by the slicer component 120. A straight skeleton method provides a linear skeleton of a given polygon by shrinking the given polygon as a function of time. By using the straight skeleton technique simultaneously on two polygons, point(s) of intersection (e.g., straight skeleton vertices) between the two polygons (e.g., one shrinking inwardly and one growing outwardly) define the midway point between the two polygons.

Figure 2:
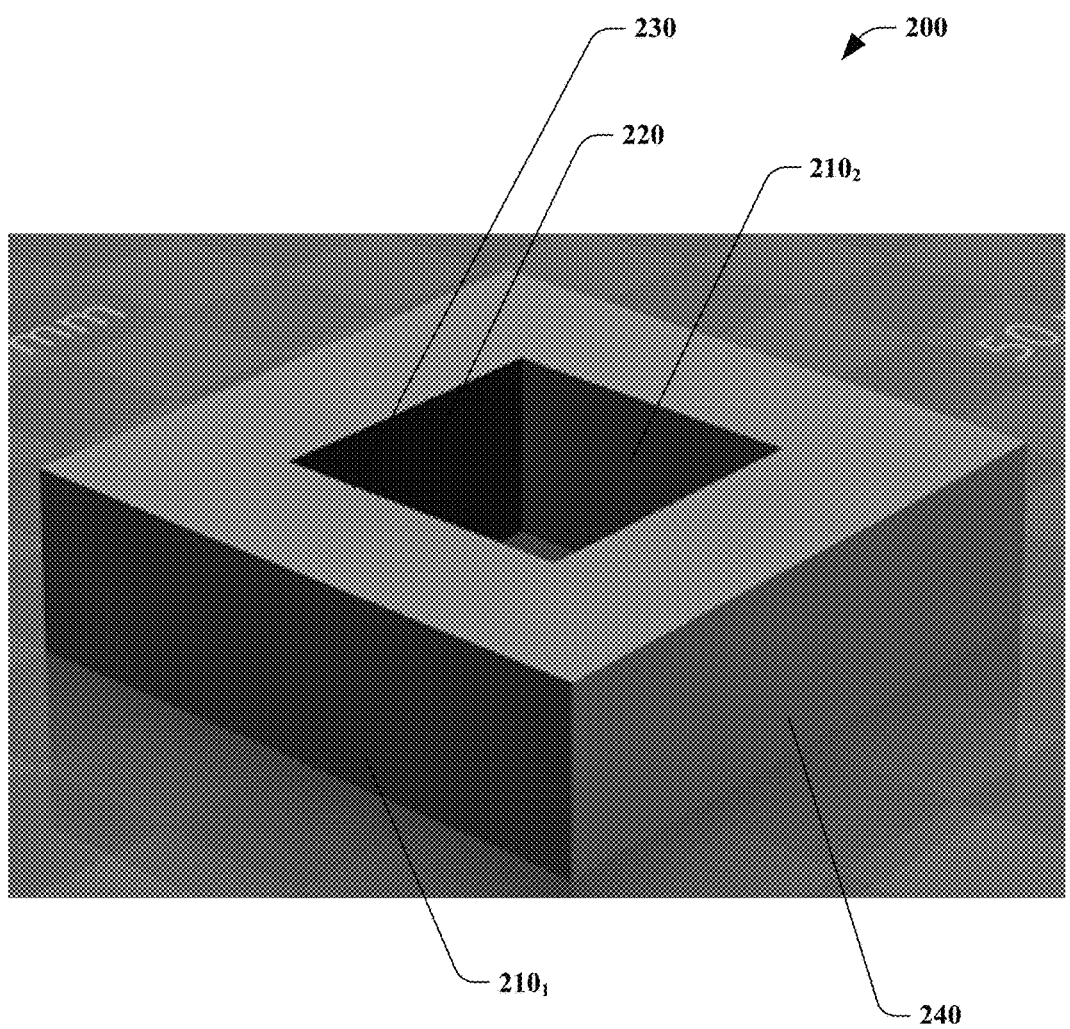
FIG. 2 illustrates an exemplary three-dimensional object to be fabricated.

Turning briefly to FIG. 2, an exemplary three-dimensional object 200 to be fabricated is illustrated. The object 200 comprises four materials 210, 220, 230, 240 to be deposited by extruders of the fabrication apparatus 110. Four materials are utilized in this example for purposes of explanation as the system 100 can be utilized with a plurality of extruders.

Figure 3:
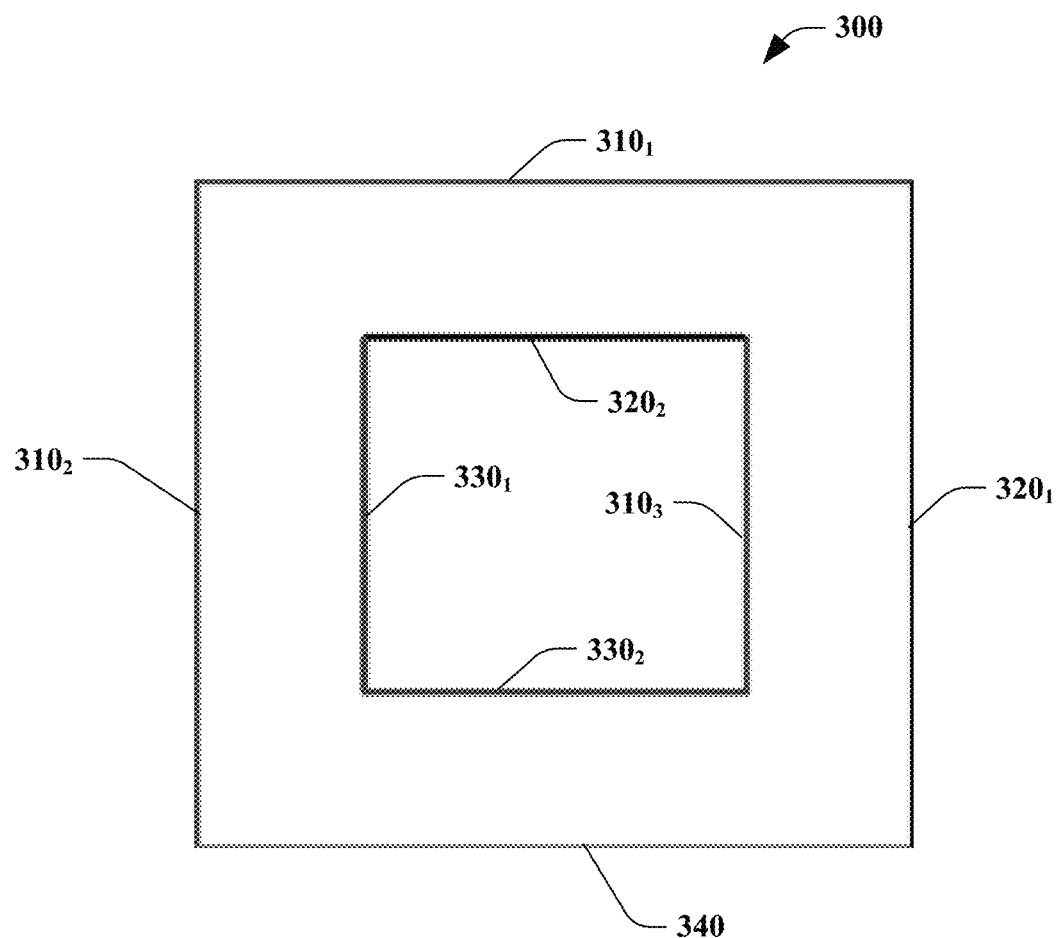
FIG. 3 illustrates an exemplary cross-section of the object comprising two-dimensional segments.

A cross-section 300 (e.g., slicer layer) of the object 200 comprising two-dimensional segments (e.g., to be deposited by the extruders) is illustrated in FIG. 3. The cross-section 300 includes three segments $310_1$, $310_2$, $310_3$ in a first material, two segments $320_1$, $320_2$ in a second material, two segments $330_1$, $330_2$ in a third material and one segment 340 in a fourth material.

The slicer component 120 can provide information for each of the layers used to fabricate the object 200. In one embodiment, the information comprises two dimensional segments (e.g., open-contour) including material and/or color information. In order to fabricate a particular layer of the object 200, a toolpath for the extruders of the fabrication apparatus 110 is generated.

Conventionally, discontinuous tool paths were generated for each of the two-dimensional segments. However, these discontinuous tool paths generated open-contour, two-dimensional segments that in many instances did not bind which resulted in an object which was fragile.

The closed contour component 130 can compute closed contours (e.g., two-dimensional polygons) for each segment (e.g., two-dimensional segment having a particular color and/or material, for example, associated with a particular extruder). In one embodiment, the closed contour component 130 can employ a straight skeleton technique to compute straight skeleton vertices to compute two-dimensional polygons for each two-dimensional segment provided by the slicer component 120.

Figure 4:
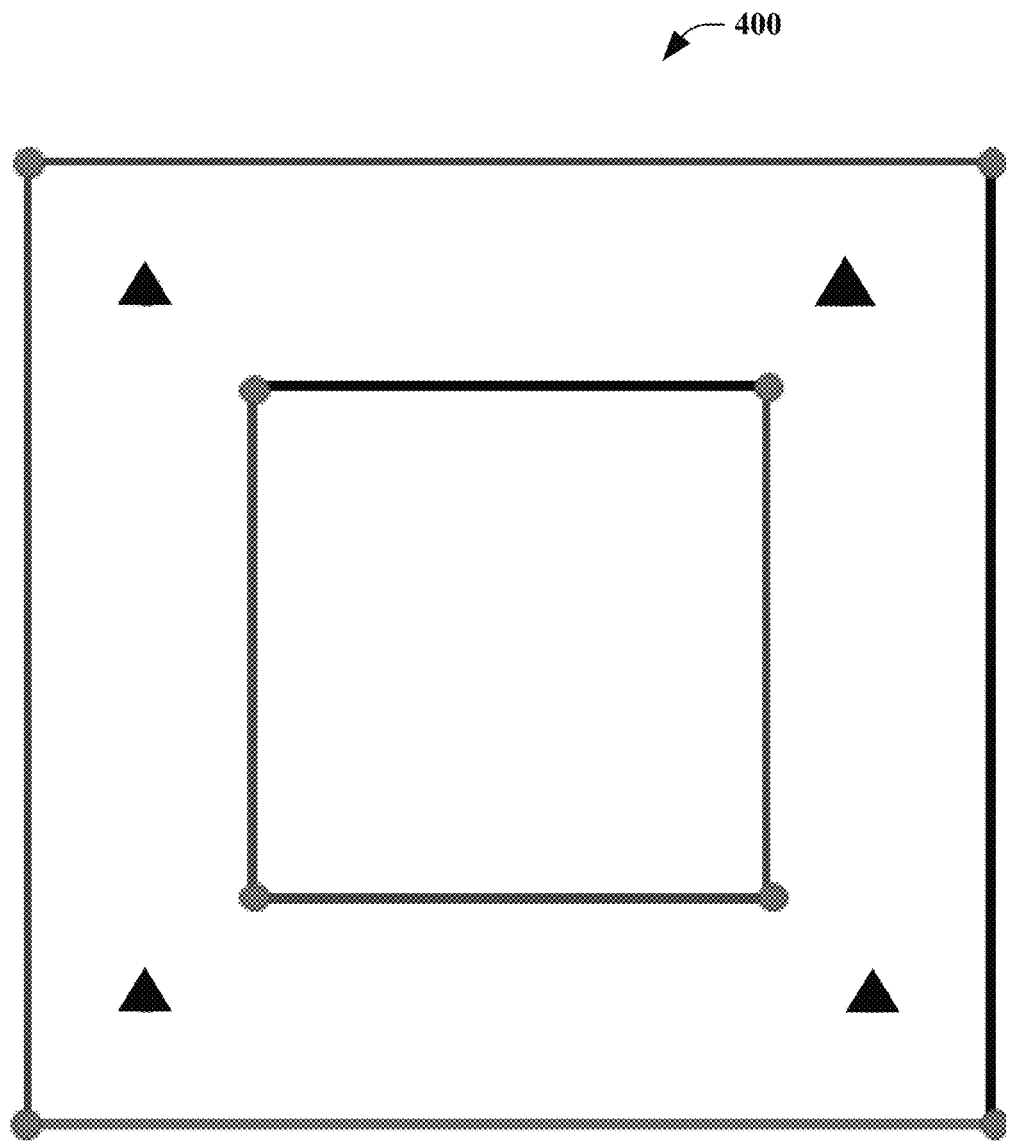
FIG. 4 illustrates an exemplary slice layer with computed straight skeleton vertices is illustrated.

Referring to FIG. 4, a slice layer 400 with computed straight skeleton vertices is illustrated. Base vertices are depicted with a filled circle. Using a straight skeleton technique, straight skeleton vertices (depicted with filled triangles) are determined by the closed contour component 130. The closed contour component 130 can then compute closed contour two-dimensional polygons based on the computed straight skeleton vertices.

Figure 5:
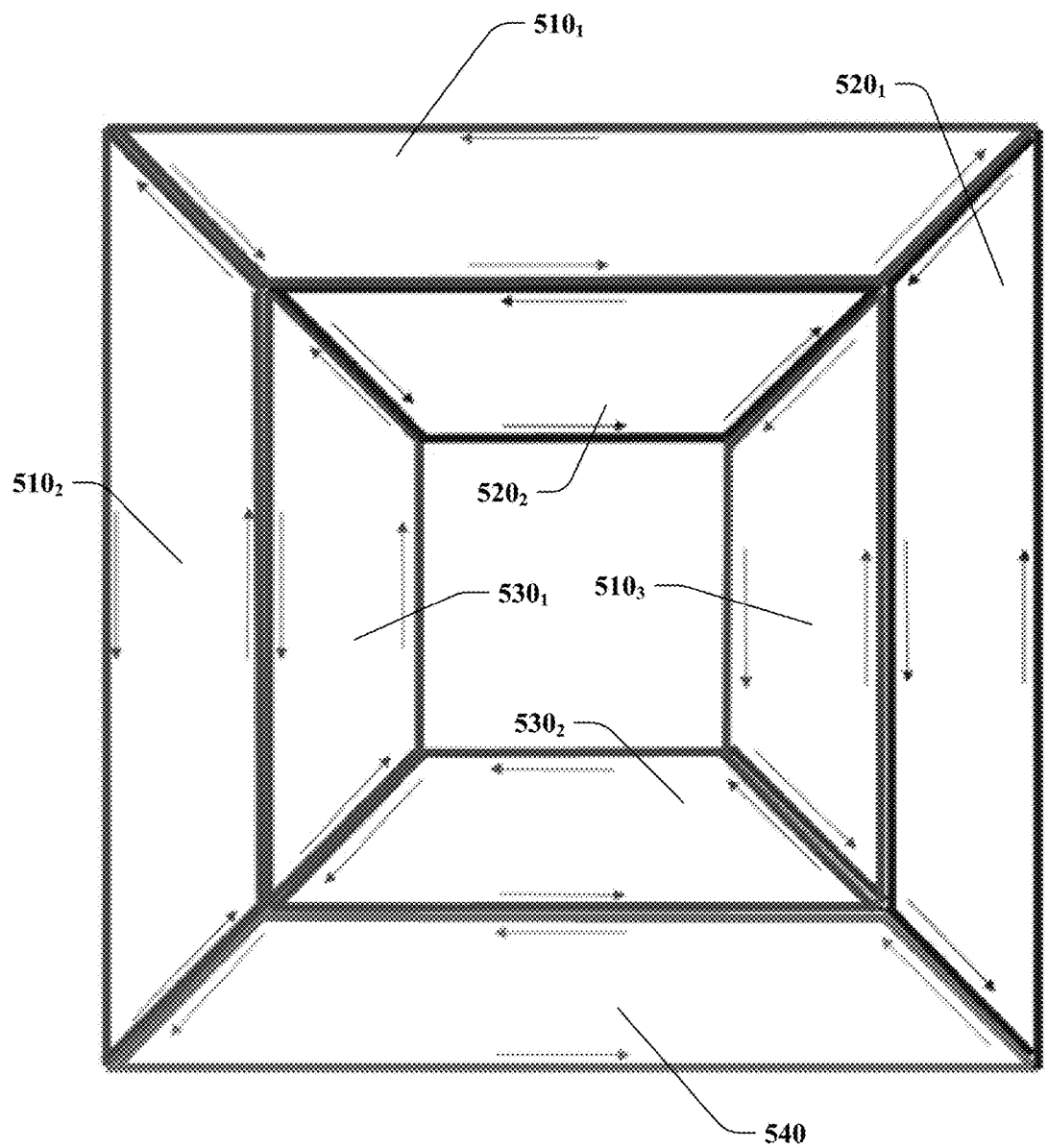
FIG. 5 illustrates a slice layer including two-dimensional polygons.

Turning to FIG. 5, a slice layer 500 includes two-dimensional polygons $510_1$, $510_2$, $510_3$ in the first material, two segments in the second material $520_1$, $520_2$, two segments $530_1$, $530_2$ in the third material and one segment 540 in a fourth material. As illustrated in FIG. 5, the tool path generation component 140 can generate tool paths for each of the plurality of extruders based on the computed closed contours.

The tool path generation component 140 can provide the generated tool path(s) to the fabrication apparatus 110. In one embodiment, the generated tool path(s) are provided as coordinated instructions (e.g., op codes, g-code and/or the like) to the fabrication apparatus 110.

In one embodiment, two dimensional polygon(s) of a first extruder are deposited before two dimensional polygon(s) of a second extruder. In one embodiment, two dimensional polygon(s) of a first extruder are deposited before two dimensional polygon(s) of a second extruder with another two dimensional polygon of the first extruder deposited thereafter.

Figure 6:
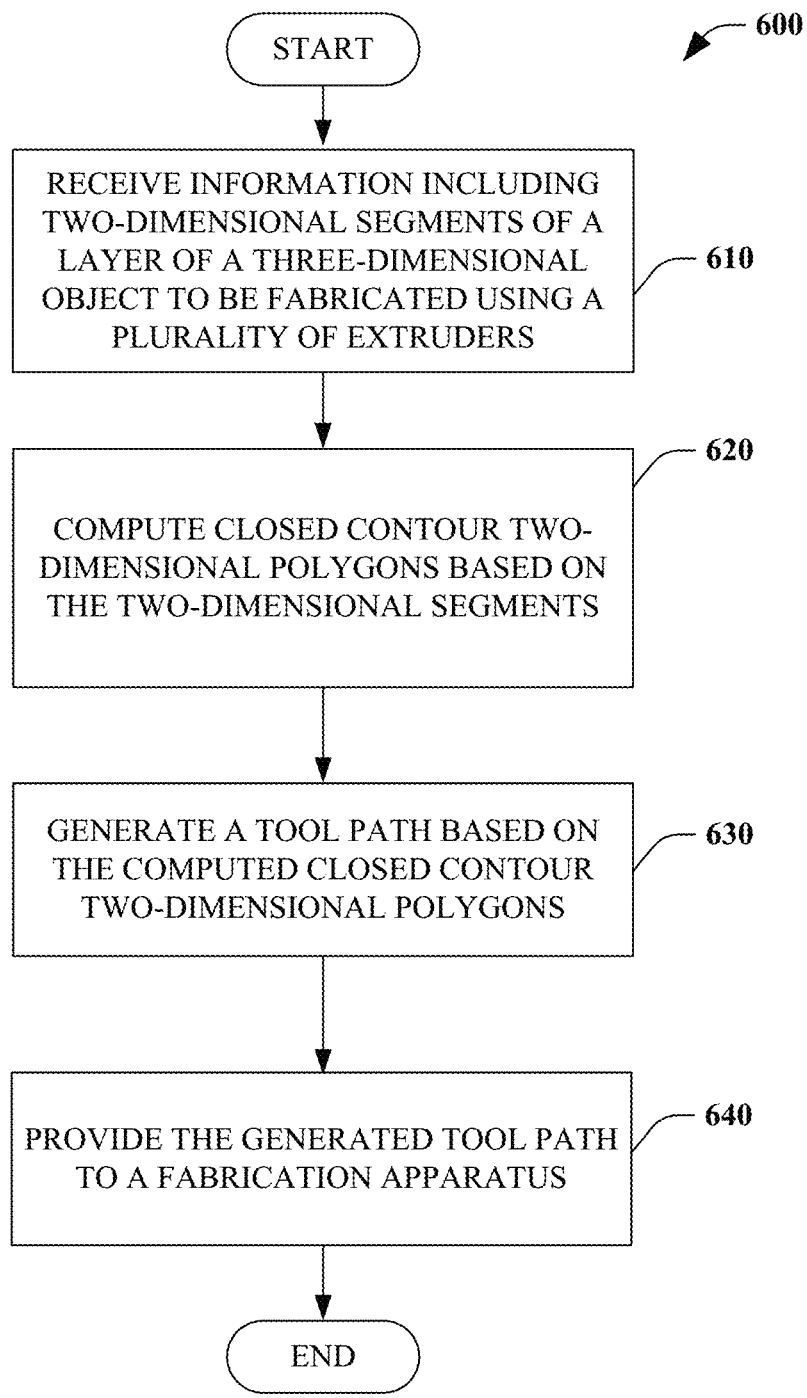
FIG. 6 illustrates an exemplary a method of generating a toolpath using closed contours for a fabrication device comprising a plurality of extruders in three-dimensional object fabrication.

FIG. 6 illustrates an exemplary methodology relating to generating a toolpath using closed contours for a fabrication device comprising a plurality of extruders. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 6, a method of generating a toolpath using closed contours for a fabrication device comprising a plurality of extruders in three-dimensional object fabrication 600 is illustrated.

At 610, information including two-dimensional segments of a layer of a three-dimensional object to be fabricated using a plurality of extruders is received (e.g., from a slicer component 120). At 620, closed contour two-dimensional polygons are computed based on the two-dimensional segments. In one embodiment, the closed contour two-dimensional polygons are computed by a closed contour component 130 using a straight skeleton technique, as discussed above.

At 630, a tool path is generated based on the computed closed contour two-dimensional polygons (e.g., the tool path comprising instructions to control movement of a component of a fabrication apparatus). At 640, the generated tool path is provided to a fabrication apparatus.

Described herein is a computing device, comprising a processor and a memory having computer-executable instructions stored thereupon which, when executed by the processor, cause the computing device to: receive information including two-dimensional segments of a layer of a three-dimensional object to be fabricated using the plurality of extruders; compute closed contour two-dimensional polygons based on the two-dimensional segments, wherein each computed closed contour two-dimensional polygon comprises at least one of the two-dimensional segments; generate a tool path based on the computed closed contour two-dimensional polygons, the tool path comprising instructions to control movement of a component of a fabrication apparatus; and provide the generated tool path to the fabrication apparatus. The computing device can include wherein the closed contour two-dimensional polygons are computed using a straight skeleton technique.

The computing device can include wherein the received information further includes at least one of a particular color or a particular material associated with a particular extruder of the plurality of extruders. The computing device can further include wherein the tool path is further generated based upon a material associated with a particular extruder of the plurality of extruders. The computing device can include wherein the closed contour two-dimensional polygons are computed with each two-dimensional segment being associated with a particular computed two-dimensional polygon.

The computing device can include wherein each two-dimensional polygon is associated with a particular extruder of the plurality of extruders. The computing device can further include wherein the received information comprises a 3D Manufacturing Format (3MF) file.

Described herein is a method of generating a toolpath using closed contours for a fabrication device comprising a plurality of extruders in three-dimensional object fabrication, comprising: receiving information including two-dimensional segments of a layer of a three-dimensional object to be fabricated using the plurality of extruders; computing closed contour two-dimensional polygons based on the two-dimensional segments, wherein each computed closed contour two-dimensional polygon comprises at least one of the two-dimensional segments; generating a tool path based on the computed closed contour two-dimensional polygons, the tool path comprising instructions to control movement of a component of a fabrication apparatus; and providing the generated tool path to the fabrication apparatus.

The method can include wherein the closed contour two-dimensional polygons are computed using a straight skeleton technique. The method can further include wherein the received information further includes at least one of a particular color or a particular material associated with a particular extruder of the plurality of extruders. The method can include wherein the tool path is further generated based upon a material associated with a particular extruder of the plurality of extruders.

The method can include wherein the closed contour two-dimensional polygons are computed with each two-dimensional segment being associated with a particular computed two-dimensional polygon. The method can further include wherein each two-dimensional polygon is associated with a particular extruder of the plurality of extruders. The method can include wherein the received information comprises a 3D Manufacturing Format (3MF) file.

Described herein is a computer storage media storing computer-readable instructions that when executed cause a computing device to: receive information including two-dimensional segments of a layer of a three-dimensional object to be fabricated using the plurality of extruders; compute closed contour two-dimensional polygons based on the two-dimensional segments, wherein each computed closed contour two-dimensional polygon comprises at least one of the two-dimensional segments; generate a tool path based on the computed closed contour two-dimensional polygons, the tool path comprising instructions to control movement of a component of a fabrication apparatus; and provide the generated tool path to the fabrication apparatus.

The computer storage media can include wherein the closed contour two-dimensional polygons are computed using a straight skeleton technique. The computer storage media can further include wherein the received information further includes at least one of a particular color or a particular material associated with a particular extruder of the plurality of extruders. The computer storage media can include wherein the tool path is further generated based upon a material associated with a particular extruder of the plurality of extruders.

The computer storage media can include wherein the closed contour two-dimensional polygons are computed with each two-dimensional segment being associated with a particular computed two-dimensional polygon. The computer storage media can further include wherein each two-dimensional polygon is associated with a particular extruder of the plurality of extruders.

Figure 7:
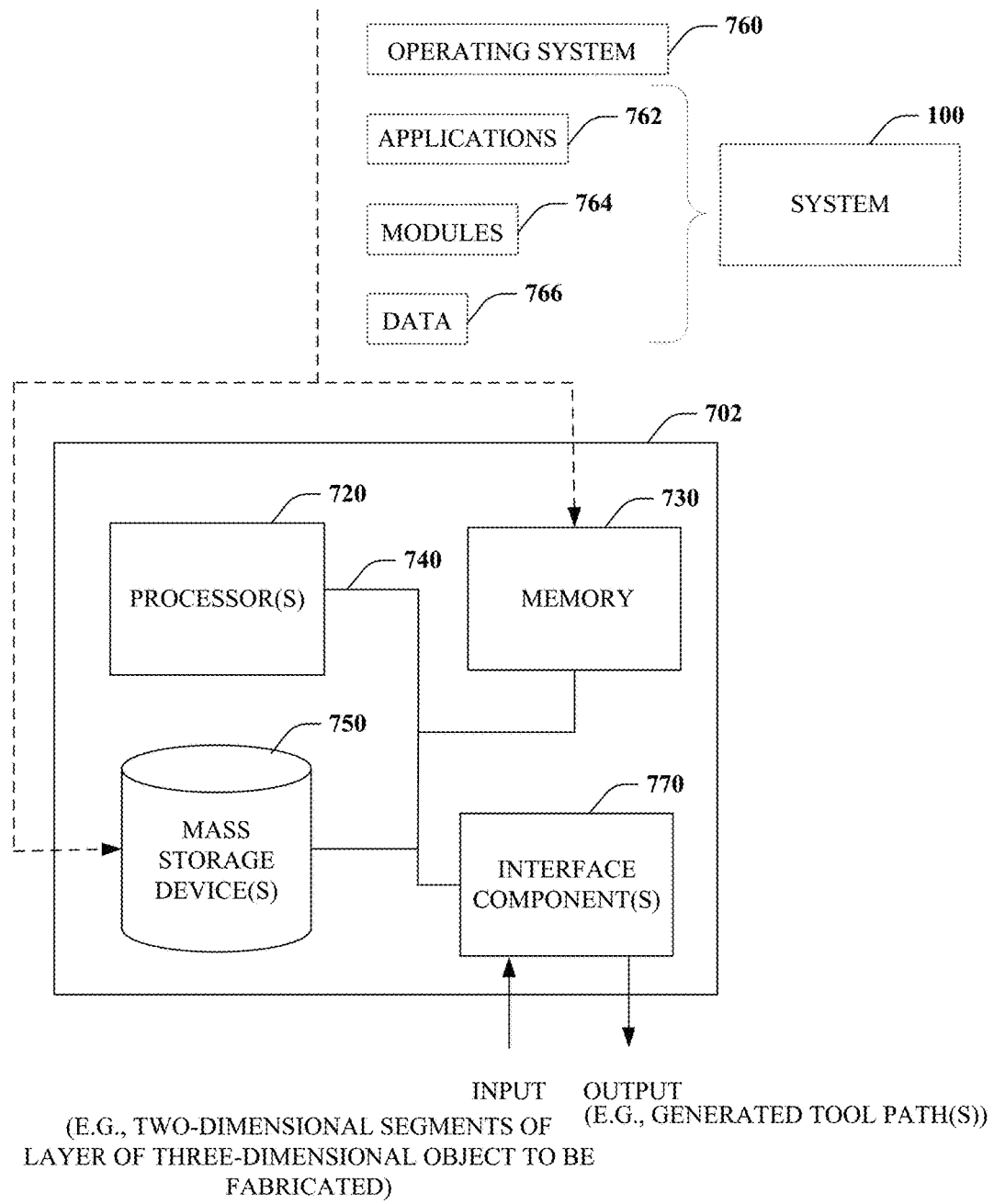
FIG. 7 is a functional block diagram that illustrates an exemplary computing system.

With reference to FIG. 7, illustrated is an example general-purpose computer or computing device 702 (e.g., mobile phone, desktop, laptop, tablet, watch, server, handheld, programmable consumer or industrial electronics, set-top box, game system, compute node, etc.). For instance, the computing device 702 may be used in a system for fabricating a three-dimensional object using multiple extruders 100.

The computer 702 includes one or more processor(s) 720, memory 730, system bus 740, mass storage device(s) 750, and one or more interface components 770. The system bus 740 communicatively couples at least the above system constituents. However, it is to be appreciated that in its simplest form the computer 702 can include one or more processors 720 coupled to memory 730 that execute various computer executable actions, instructions, and or components stored in memory 730. The instructions may be, for instance, instructions for implementing functionality described as being carried out by one or more components discussed above or instructions for implementing one or more of the methods described above.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 720 can be a graphics processor.

The computer 702 can include or otherwise interact with a variety of computer-readable media to facilitate control of the computer 702 to implement one or more aspects of the claimed subject matter. The computer-readable media can be any available media that can be accessed by the computer 702 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 702. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 730 and mass storage device(s) 750 are examples of computer-readable storage media. Depending on the exact configuration and type of computing device, memory 730 may be volatile (e.g., RAM), non-volatile (e.g., ROM, flash memory, etc.) or some combination of the two. By way of example, the basic input/output system (BIOS), including basic routines to transfer information between elements within the computer 702, such as during start-up, can be stored in nonvolatile memory, while volatile memory can act as external cache memory to facilitate processing by the processor(s) 720, among other things.

Mass storage device(s) 750 includes removable/non-removable, volatile/non-volatile computer storage media for storage of large amounts of data relative to the memory 730. For example, mass storage device(s) 750 includes, but is not limited to, one or more devices such as a magnetic or optical disk drive, floppy disk drive, flash memory, solid-state drive, or memory stick.

Memory 730 and mass storage device(s) 750 can include, or have stored therein, operating system 760, one or more applications 762, one or more program modules 764, and data 766. The operating system 760 acts to control and allocate resources of the computer 702. Applications 762 include one or both of system and application software and can exploit management of resources by the operating system 760 through program modules 764 and data 766 stored in memory 730 and/or mass storage device (s) 750 to perform one or more actions. Accordingly, applications 762 can turn a general-purpose computer 702 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 762, and include one or more modules 764 and data 766 stored in memory and/or mass storage device(s) 750 whose functionality can be realized when executed by one or more processor(s) 720.

In accordance with one particular embodiment, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 702 also includes one or more interface components 770 that are communicatively coupled to the system bus 740 and facilitate interaction with the computer 702. By way of example, the interface component 770 can be a port (e.g., serial, parallel, PCMCIA, USB, FireWire, etc.) or an interface card (e.g., sound, video, etc.) or the like. In one example implementation, the interface component 770 can be embodied as a user input/output interface to enable a user to enter commands and information into the computer 702, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 770 can be embodied as an output peripheral interface to supply output to displays (e.g., LCD, LED, plasma, etc.), speakers, printers, and/or other computers, among other things. Still further yet, the interface component 770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing device, comprising:
   a processor;
   a memory having computer-executable instructions stored thereupon which, when executed by the processor, cause the computing device to:
   receive information including two-dimensional segments of a layer of a three-dimensional object to be fabricated using a plurality of extruders;
   compute closed contour two-dimensional polygons for each of the two-dimensional segments, wherein each computed closed contour two-dimensional polygon comprises at least one of the two-dimensional segments;
   generate a tool path using closed contours based on the computed closed contour two-dimensional polygons, the tool path comprising instructions to control movement of a component of a fabrication apparatus; and
   provide the generated tool path to the fabrication apparatus.

2. The computing device of claim 1, wherein the closed contour two-dimensional polygons are computed using a straight skeleton technique.

3. The computing device of claim 1, wherein the received information further includes at least one of a particular color or a particular material associated with a particular extruder of the plurality of extruders.

4. The computing device of claim 1, wherein the tool path is further generated based upon a material associated with a particular extruder of the plurality of extruders.

5. The computing device of claim 1, wherein the closed contour two-dimensional polygons are computed with each two-dimensional segment being associated with a particular computed two-dimensional polygon.

6. The computing device of claim 1, wherein each two-dimensional polygon is associated with a particular extruder of the plurality of extruders.

7. The computing device of claim 1, wherein the received information comprises a 3D Manufacturing Format (3MF) file.

8. A method of generating a toolpath using closed contours for a fabrication device comprising a plurality of extruders in three-dimensional object fabrication, comprising:
   receiving information including two-dimensional segments of a layer of a three-dimensional object to be fabricated using the plurality of extruders;
   computing closed contour two-dimensional polygons for each of the two-dimensional segments, wherein each computed closed contour two-dimensional polygon comprises at least one of the two-dimensional segments;
   generating a tool path using closed contours based on the computed closed contour two-dimensional polygons, the tool path comprising instructions to control movement of a component of a fabrication apparatus; and
   providing the generated tool path to the fabrication apparatus.

9. The method of claim 8, wherein the closed contour two-dimensional polygons are computed using a straight skeleton technique.

10. The method of claim 8, wherein the received information further includes at least one of a particular color or a particular material associated with a particular extruder of the plurality of extruders.

11. The method of claim 8, wherein the tool path is further generated based upon a material associated with a particular extruder of the plurality of extruders.

12. The method of claim 8, wherein the closed contour two-dimensional polygons are computed with each two-dimensional segment being associated with a particular computed two-dimensional polygon.

13. The method of claim 8, wherein each two-dimensional polygon is associated with a particular extruder of the plurality of extruders.

14. The method of claim 8, wherein the received information comprises a 3D Manufacturing Format (3MF) file.

15. A computer storage media storing computer-readable instructions that when executed cause a computing device to:
   receive information including two-dimensional segments of a layer of a three-dimensional object to be fabricated using a plurality of extruders;
   compute closed contour two-dimensional polygons for each of the two-dimensional segments, wherein each computed closed contour two-dimensional polygon comprises at least one of the two-dimensional segments;
   generate a tool path using closed contours based on the computed closed contour two-dimensional polygons, the tool path comprising instructions to control movement of a component of a fabrication apparatus; and
   provide the generated tool path to the fabrication apparatus.

16. The computer storage media of claim 15, wherein the closed contour two-dimensional polygons are computed using a straight skeleton technique.

17. The computer storage media of claim 15, wherein the received information further includes at least one of a particular color or a particular material associated with a particular extruder of the plurality of extruders.

18. The computer storage media of claim 15, wherein the tool path is further generated based upon a material associated with a particular extruder of the plurality of extruders.

19. The computer storage media of claim 15, wherein the closed contour two-dimensional polygons are computed with each two-dimensional segment being associated with a particular computed two-dimensional polygon.

20. The computer storage media of claim 15, wherein each two-dimensional polygon is associated with a particular extruder of the plurality of extruders.

* * * * *